Nov. 10, 1970  D. KELLERMAN  3,539,886
FLAT, WOUND, HIGH VOLTAGE CAPACITOR ARRANGEMENT
Filed April 11, 1969  2 Sheets-Sheet 1
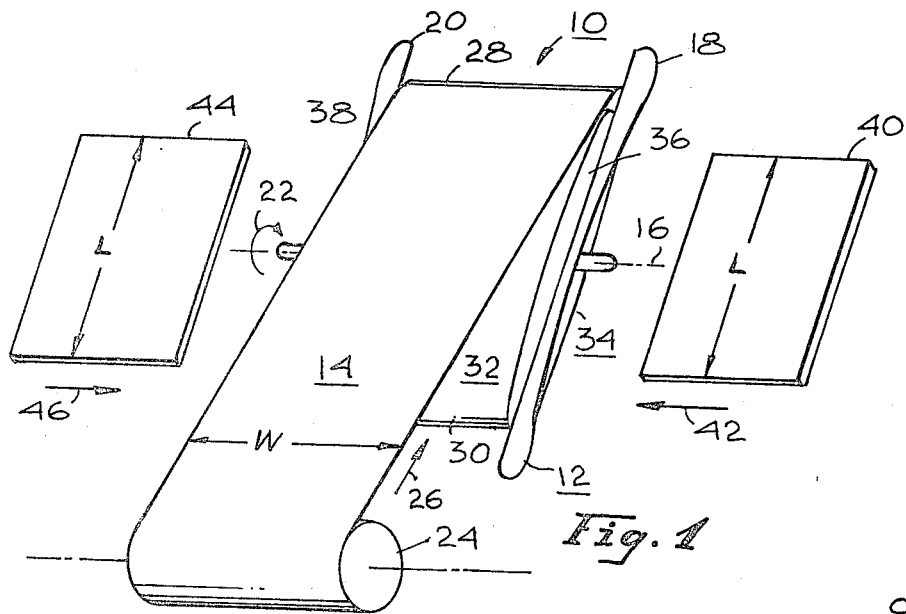
Fig. 1
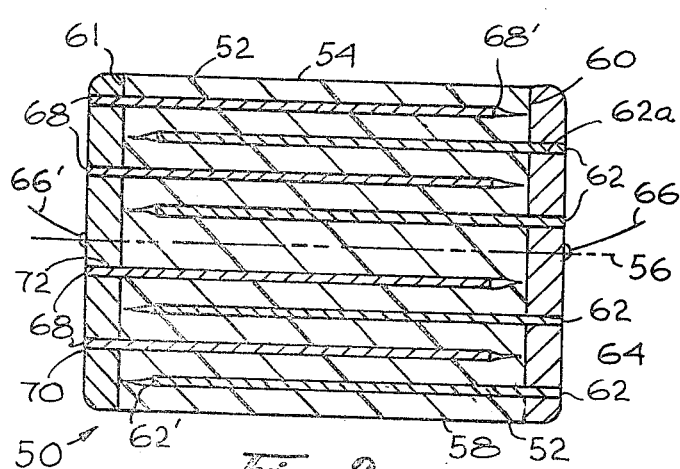
Fig. 2
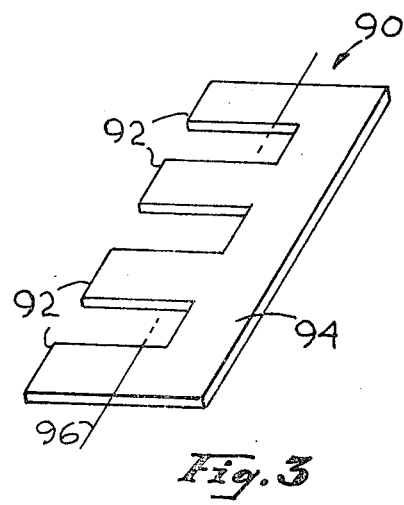
Fig. 3
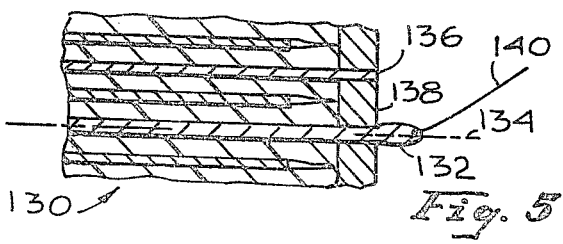
Fig. 5
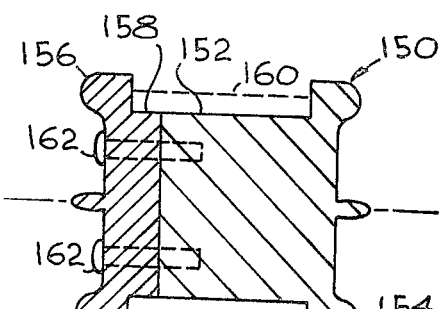
Fig. 6
Fig. 4
INVENTOR
DAVID KELLERMAN
BY
Don Finkelstein
ATTORNEY

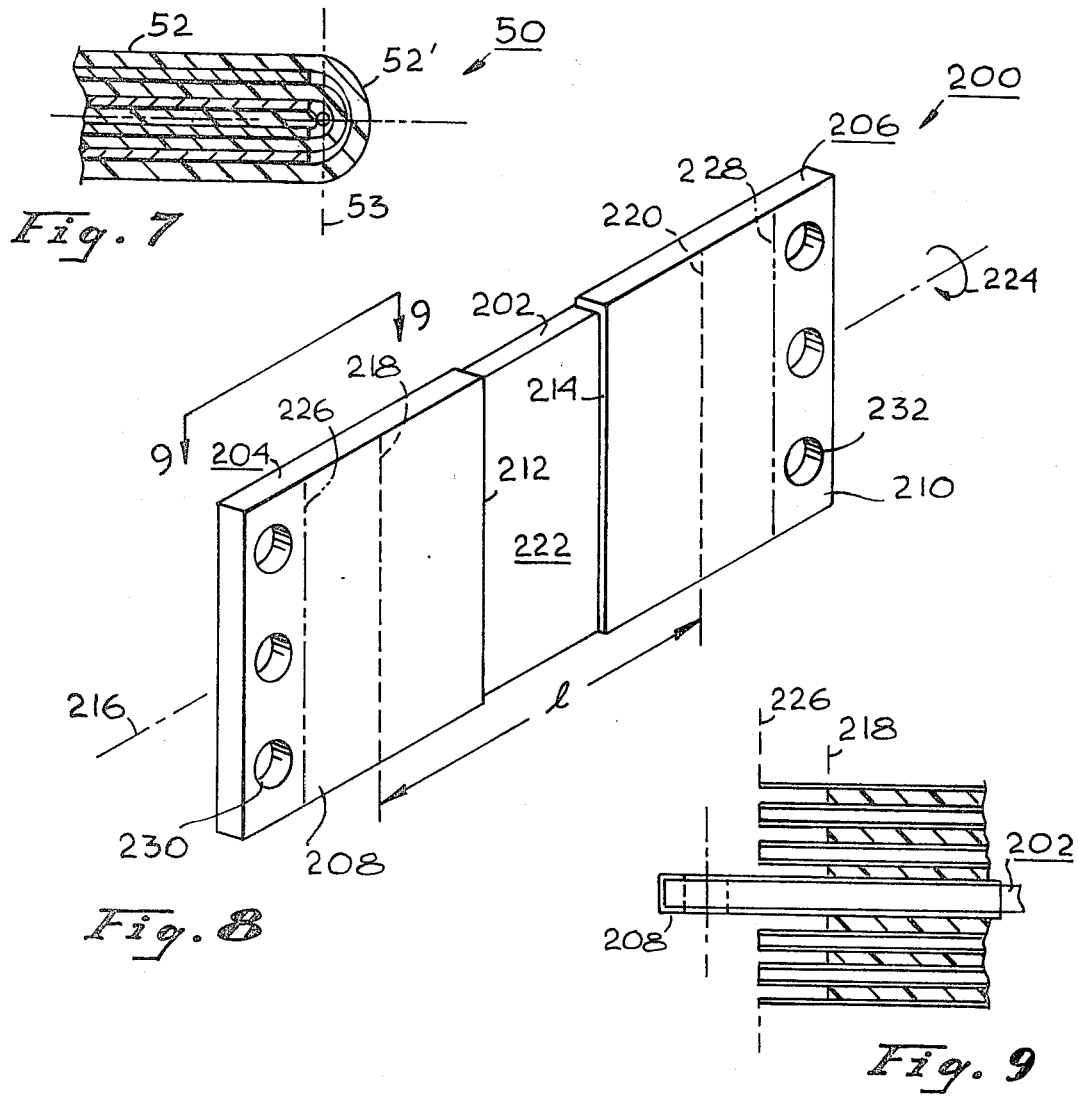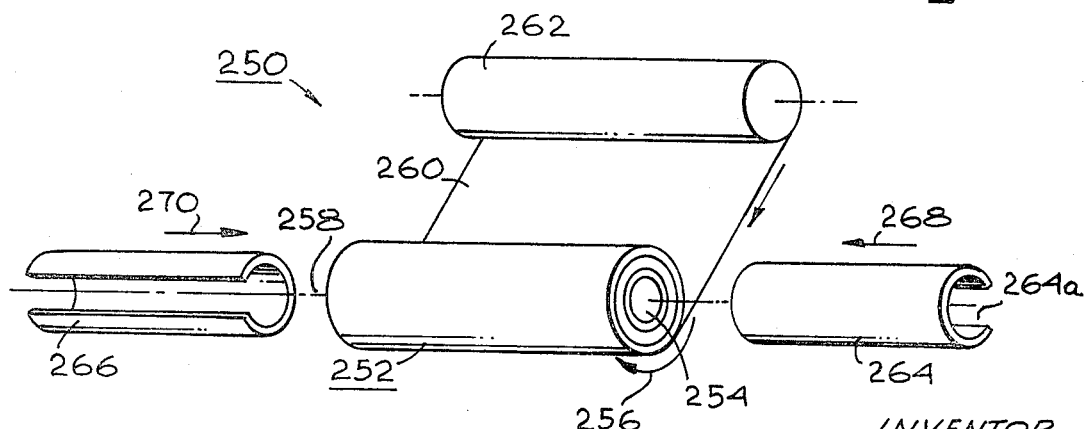

United States Patent Office 3,539,886
Patented Nov. 10, 1970

3,539,886
FLAT, WOUND, HIGH VOLTAGE CAPACITOR ARRANGEMENT
David Kellerman, 1485 S. Cardiff,
Los Angeles, Calif. 90035
Filed Apr. 11, 1969, Ser. No. 815,335
Int. Cl. H01g 3/17
U.S. Cl. 317—260                                14 Claims

ABSTRACT OF THE DISCLOSURE

A high voltage capacitor arrangement in which a thin sheet dielectric is spirally wound around a spindle. During the continuous winding process capacitor plates may be selectively inserted between adjacent layers of the winding and one or more of such plates may be grouped together and electrically connected together to form a first capacitor plate and one or more other plates may be electrically connected together to form a second capacitor plate. Capacitor leads are attached to each of the capacitor plates to allow subsequent utilization of the capacitor.

BACKGROUND OF THE INVENTION

Field of the invention

This invention relates to the capacitor art and more specifically to an improved, flat, wound, capacitor uniquely adapted for high voltage capacitors and the method of making same.

Description of the prior art

In the electronic component field it is generally desirable to provide the maximum performance capability of a component in the minimum space and with the minimum volume possible. Accordingly, in many applications, flat or rectangular prismatic components such as resistors, capacitors, integrated circuit chips, and other components, are fabricated or desired to be fabricated in these prismatic shapes so they may be conveniently stacked. That is, cylindrical components widely used in the past often result in a comparatively large amount of waste space when the total volume of, for example, a circuit or electronic device is computed. Rectangular, prismatic components, on the other hand (which may generally be referred to as "flat" components), can allow an extremely high packing density with virtually no waste space if desired.

In the capacitor art it is well established that for a desired dielectric strength, a plurality of thin layers of a dielectric are superior to a single, thick layer of even the same dielectric material. That is, many thin layers provide a greater dielectric strength than does a single layer of an equivalent thickness. The reasons for this are, of course, well known to those skilled in the art and these reasons involve the low probability that a non-uniform or weakened spot in the mutlitude of layers would be so aligned as to result in a severely decreased dielectric constant. Therefore, winding of capacitors utilizing a thin sheet dielectric, such as the currently available sheet plastics including Mylar (a trademarke of E. I. du Pont de Nemours and Company, Wilmington, Del.) metallized or not as desired, polycarbonate, tetrafluorethylene, monochloro trifluorethylene, and the like.

Generally, two dielectric layers were simultaneously wound with the electrically conductive layers forming the capacitor plates interspersed therebetween. If the dielectric was metallized, of course, then no such separate electrically conductive layers were required. However, such units were generally limited, of course, to fabrication techniques utilizing thin, flexible, electrically conductive materials, such as thin foil or metallized coatings to allow the winding process. Capacitors produced in this manner while generally satisfactory for comparatively low voltage were often unsuited for high voltages due to the breakdown coefficient in the layers of the dielectric. That is, increasing the number of layers between adjacent capacitor plates required either an increase in the thickness of the dielectric sheet, which was undesirable, or an increase in the number of simultaneous windings which often presented extremely complicated machinery and structure. Further, such capacitors were invariably cylindrical and thus did not generally adaptable to high density packing in limited volumes. Attempts to flatten such capacitors to allow high density packing often resulted in fracturing or rupturing the electrically conductive layers forming the capacitor plates therein.

Thus, there has long been a need for a flat, wound capacitor in which the number of layers of dielectric between adjacent capacitor plates may be selected as desired and in which the fabrication technique is not unduly complicated. Further, it has been desired that such capacitors allow utilization of comparatively heavy, electrically conductive elements to comprise the capacitor plates in order to obtain low inductance, high thermal conductivity, high current and high voltage handling characteristics.

BRIEF DESCRIPTION OF THE INVENTION

Accordingly, it is an object of applicant's invention herein to provide an improved capacitor.

It is another object of applicant's invention herein to provide an improved flat, wound, high voltage capacitor.

It is yet another object of applicant's invention herein to provide an improved flat, wound, high voltage capacitor in which the number of layers of dielectric winding between adjacent plates may be selected as desired and comparatively heavy and nonflexible electrically conductive elements utilized as the capacitor plates.

The above objects, and others, are achieved, according to a preferred embodiment of applicant's invention, by providing a generally, flat, elongated, spingle means having a thin quadrilateral body portion and a pair of spaced-apart rim portions coupled to oppositely disposed side edges of the body portion. A thin sheet dielectric is wound around the body portion of the pindle means by, for example, rotating the spindle about an axis perpendicular to the pair of rim members.

After any desired number of layers of the dielectric material have been wound on the spindle an electrically conductive plate is inserted from the rim sides of the spindle between adjacent layers of the dielectric. Insertion of these electrical plates is then repeated at pre-selected intervals of dielectric layer windings from opposite sides of the spindle until the desired number of capacitor plates for each of the two capacitor electrodes have been inserted.

In this embodiment of applicant's invention the spindle is then removed by removing one of the rims from the body portion and sliding it out. If desired the entire capacitor may then be flattened to eliminate waste space that was left in the neutral plane of the capacitor by the spindle. Capacitor leads may then be attached to each of the capacitor plate means to provide the desired capacitor. The individual capacitor plates may be any desired thickness of material, and, since they do not extend around the flat, spirally wound capacitor, they need not be flexible but may be sufficiently rigid or thick to provide any desired voltage.

In other embodiments of applicant's invention the spindle, or in some embodiments, only the body portion thereof, is left inserted in the neutral plane of the capacitor and becomes a portion of one of the capacitor plate means by suitable electrical connection.

In other embodiments, the end portions of the winding may be removed after winding to minimize even further the space required for the capacitor according to applicant's invention herein.

BRIEF DESCRIPTION OF THE DRAWING

Applicant's invention of an improved, flat, wound, high voltage capacitor arrangement may be more fully understood from the following detailed description taken together with the accompanying drawings wherein similar reference characters refer to similar elements throughout and in which:

FIG. 1 is a perspective view of a flat, wound, high voltage capacitor according to applicant's invention herein in the process of being fabricated;

FIG. 2 is a sectional view through a flat, wound, high voltage capacitor fabricated according to applicant's invention herein;

FIG. 3 illustrates a capacitor plate useful in the practice of applicant's invention herein;

FIG. 4 illustrates another embodiment of applicant's invention herein;

FIG. 5 illustrates another embodiment of applicant's invention herein;

FIG. 6 illustrates a spindle means useful in the practice of applicant's invention herein; and FIG. 7 illustrates a sectional view of one embodiment of applicant's invention herein;

FIGS. 8 and 9 illustrate another embodiment of applicant's invention; and

FIG. 10 illustrates another embodiment of applicant's invention.

DESCRIPTION OF THE PREFERRED EMBODIMENTS

Referring now to the drawings, FIG. 1 illustrates a perspective view of one embodiment of an improved flat, wound, high voltage capacitor arrangement, generally designated 10, according to the principles of applicant's invention herein. As shown on FIG. 1, there is a spindle means 12 about which a thin sheet dielectric 14 is being wound due to rotation of the spindle means 12 about an axis 16 passing through and perpedicularly to the two rim portions 18 and 20 of the spindle means 12. It will be appreciated that any desired rotation producing device (not shown) may be utilized to rotate the spindle 12 about the axis 16, to wind the thin sheet dielectric 14 thereon. As the spindle 12 is rotated about the axis 16 in the direction indicated by the arrow 22, the thin sheet dielectric 14 is unwound from the dielectric roll 24 in the direction indicated by the arrow 26 to be wound on the spindle 12 between the rim portions 18 and 20. It will be appreciated that the thin sheet dielectric 14 is wound in a continuous spiral winding on the spindle 12. However, it is generally accepted practice in the capacitor art to refer to the winding as a plurality of layers of winding on each side of a neutral plane defined by the spindle means 12. By maintaining the proper tension on the thin sheet dielectric 14 it can be seen that a substantially flat or rectangular prismatic winding thereof on the spindle 12 is obtained with rounded end portions 28 and 30. The winding will generally be substantially symmetrical about the neutral plane defined by the spindle means 12. For convenience it may be considered that the thin sheet dielectric 14 is wound on a first side 32 of the spindle means 12 and also on a second side 34 of the spindle means 12. The first side 32 may be conveniently referred to as a top portion of the capacitor 10 and the second side 34 may be conveniently referred to as a lower portion of the capacitor 10. Thus, the thin sheet dielectric layer 14 defines a plurality of insulating layers on both the top portion 32 and lower portion 34. The thin sheet dielectric layer 14 has a preselected width as indicated on FIG. 1 by the letter W which is the spacing between the rims 18 and 20 of the spindle 12. As wound on the spindle 12, the plurality of layers of the dielectric 14 consecutively have side edges 36 and 38 that are parallel and, of course, spaced-apart by the preselected width W of the dielectric layer 14 and the side edges 36 and 38 define the lateral boundaries of the top portion 32 and lower portion 34.

The end portions 28 and 30, of course, provide the continuous connection between the adjacent layers of the top portion 32 and the lower portion 34.

A first capacitor plate means 40 which, in this embodiment of applicant's invention, is a single capacitor plate fabricated from a substantially rigid electrically conductive material may be inserted in the direction indicated by the arrow 42 between adjacent layers of the thin sheet dielectric. The thin sheet dielectric is then wound some more until another preselected number of layers has been built up on the first capacitor electrode 40 and then a second capacitor electrode 44 may be inserted between adjacent layers of the thin sheet dielectric 14 in the direction indicated by the arrow 46. Each of the first electrically conductive first capacitor plate means 40 and second electrically conductive capacitor plate means 44 have a preselected length indicated by the letter L on FIG. 1 that is less than the distance between the end 28 and end 30 of the spirally wound, thin sheet dielectric 14 on the spindle means 12. As described below in greater detail, this positions the first electrically conductive capacitor plate means 40 and second electrically conductive capacitor plate means 44 interior of the end portion of the dielectric winding.

After the first capacitor plate 40 and second capacitor plate 44 have been inserted and the desired number of windings of the electrically insulating dielectric material 14 are achieved the last layer of the dielectric may be sealed by bonding or otherwise to the next adjacent layer to prevent unwinding thereof and, if desired, the spindle 12, as described below in greater detail, removed. Lead connetcing means may be coupled to each of the first capacitor plate means 40 and second capacitor plate means 44 to allow suitable connection of the capacitor 10 in an electric circuit (not shown). The capacitor 10 may then be compressed to eliminate waste space in the neutral plane that was previously occupied by the spindle means 12.

The embodiment shown in FIG. 1 illustrates applicant's invention when only one individual plate comprises the second capacitor plate means. It will be appreciated that additional individual capacitor plate means may be sequentially inserted into the winding after preselected number of layers have been built up to any extent desired to provide any desired capacitance. Since the electrically conductive capacitor plates do not have to bend or flex around the ends 30 and 28 they may be fabricated from any desired thickness of electrically conductive material. For example, they may be electrically conductive aluminum, copper, plated materials, or the like, having a thickness, for example, of 0.002 inch. The thickness of the dielectric sheet 14, on the other hand, is preferably maintained comparatively thin so that a greater dielectric efficiency may be achieved for a given thickness comprised of the plurality of windings of the thin sheet dielectric 14. Thus, any thickness of dielectric material sufficient to allow utilization in the winding process may be utilized for applicant's invention herein. That is, it may be on the order of 0.00025 inch thick or less if capable of being so utilized.

In other embodiments of applicant's invention, as noted above, a plurality of individual plates may be utilized to comprise each of the first and second capacitor plate means of applicant's improved capacitor. FIG. 2 is a sectional view of a capacitor fabricated according to the principles of applicant's invention herein, generally designated 50 taken along the axis of rotation of the spindle. As shown in FIG. 2 the capacitor 50 has a plurality of thin sheet dielectric windings 52 on a first or top side 54 of the neutral plane 56 and a substantially symmetrical configuration comprising a plurality of thin sheet dielectric windings 52 on the lower portion 58 of the capacitor 50 with respect to the neutral plane 56. The thin sheet dielectric windings 52 have side edges 60 and 61, that are substantially parallel and define the lateral boundaries of the dielectric windings 52. A first plurality of individual plate means 62 comprise a first capacitor plate means 64 in a spaced-apart relationship to each other after a preselected number of layers of the windings 52 have been achieved. Each of the capacitor plates 62 defining the first capacitor plate means 64 may be similar to the capacitor plate 40 shown in FIG. 1. Each of the individual capacitor plates 62 has a portion such as the portion 62a extending beyond the boundary defined by the edges 60 of the windings 52 to allow, in this embodiment of applicant's invention, the unit to be swagged and soldered on foil ends to provide electrically conductive connection between the individual capaictor plates 62 and to which a lead 66 may be connected to allow utilization of the capacitor 50. Each of the individual capacitor plates 62 have their remote ends such as the ends 62' spaced inwardly from the edge 61 of the windings 52 in order to prevent electrical connection to the individual capacitor plates 68 defining the second capacitor plate means 70 in this embodiment of applicant's invention. The remote ends 68', for example, of the individual plate 68, which may be similar to the individual plate 44 shown in FIG. 1, are spaced inwardly from the edges 60 for the reasons set forth above. A soldered coat 72 may be utilized to provide electrical connection between the individual capacitor plates 68 and to allow connection of the leads 66' thereto.

It will be appreciated that as many layers of dielectric may be wound on the spindle to provide any suitable diameter characteristic between adjacent capacitor plates. During the winding the individual capacitor plates 68 defining the second capacitor plate means 70 are alternatingly inserted into the windings with the first plurality of individual capacitor plates 62 defining the first capacitor plate means 64 in a manner similar to that described above in connection with FIG. 1. It will be appreciated that any desired number of capacitor plates may be inserted to allow any desired capacitor voltage and capacitance characteristics.

The individual capacitor plates 62 comprising the first capacitor plate means 64 and the individual capacitor plates 68 comprising the second capacitor plate means 70 are each continuous. However, applicant has found that a plurality of capacitors may be provided in a single capacitor arrangement according to applicant's invention by providing a segmented first capacitor plate means. That is, each of the individual plates comprising the first capacitor plate means may be segmented in an aligned array between the different individual plates to provide a group of individually, electrically conductive segments, one in each individual capacitor plate position. FIG. 3 illustrates a segmented capacitor plate generally designated 90 that may be useful in the practice of applicant's invention herein. As shown on FIG. 3, the segmented capacitor plates means 90 has a plurality of four individual segments generally designated 92 attached to a connecting portion 94. Maintaining the individual segments 92 as part of the connecting portion 94 during the fabrication of the capacitor in a manner similar to that described above in connection with FIG. 1 allows easy insertion of and alignment of the different plates 90 in each different layer position. After assembly the connective portion 94 may be removed by cutting each of the individual capacitor plate means 90 by cutting along the plane 96. Suitable electrical connection between the aligned rows of the segments may then be made to provide any desired plural capacitor configuration desired, such as, decade capacitance, delay line capacitor configurations, or the like.

While mentioned above in connection with FIG. 2, it is not always necessary to provide overhanging portions of the individual capacitor plates. That is, as shown in FIG. 4 which is a fragmentary view of one embodiment of applicant's invention, it can be seen that the end portions 110 of the individual capacitor plates 112 defining a first capacitor electrode 114 are substantially co-planer with the ends 116 of the dielectric winding 118 in the capacitor arrangement generally designated 98. A solder dip coating 120 or other electrically conductive coating means may be applied to interconnect the ends 110 of the individual plates 112 to provide the electrical connection therebetween and allow connection of the leads 122.

As noted above in connection with the description of applicant's invention shown in FIG. 2 it is mentioned that the spindle means such as the spindle 12 in FIG. 1 upon which the capacitor 50 had been wound was removed. If desired the spindle may be fabricated from electrically conductive material and then one or both rim portions removed and the remaining body portion of the spindle in the neutral plane of the capacitor may become one of the individual capacitor plates. FIG. 5 illustrates such an embodiment of applicant's invention wherein there is a capacitor generally designated 130 according to the principles of applicant's invention herein, that is fabricated generally similar to the embodiments shown in FIG. 2 and according to the method described in connection with FIG. 1 except that in this embodiment of applicant's invention the spindle means 132 is left in the neutral plane 134 and becomes a part of the first electrode 136 through electrical connection such as a soldered dip coating 138. A suitable lead 140 may be connected as desired.

FIG. 6 illustrates a spindle means generally designated 150 that may be useful in the practice of applicant's invention herein. That is, the spindle means 150 may be utilized in those embodiments wherein the spindle means is removed from the capacitor structure and also in those where it becomes a part of the capacitor plates. If it is removed from the structure it may be fabricated of any material. However, of course, if it is utilized as one of the electrically conductive capacitor plates it must be of an electrically conductive material or at least the body portion thereof. As shown, the spindle 150 has a body portion 152 extending between a pair of rim portions 154 and 156. In this embodiment of applicant's invention, the rim portion 156 also has a short segment 158 which may be considered a part of the body portion 152 that is connected to the rim 154. Thus, when dielectric windings are wound to a level indicated by the dotted line 160 and suitable capacitor plates have been inserted as desired, the screws 162 may be removed and the rim 156 removed from the structure. This leaves the body portion 152 and rim 150 which, if electrically conductive, may become part of one of the capacitor plates. Excess portions of the rim 154 may, of course, be cut way as desired. Alternatively, if desired, the entire body portion 152 and rim 154 may be removed from the capacitor.

FIG. 7 is a sectional view of the embodiments of applicant's invention shown in FIG. 2 taken along a line transverse to the neutral plane 56 and as such illustrates the end portion 52', of the winding 52. In order to minimize the space required for the capacitor 50 it may be desired to cut off the end portion 52' by cutting along the line 53.

In many embodiments of applicant's invention as described above it may be desirable, in those embodiments wherein the spindle is utilized as part of the final capacitor structure, it may be desired to provide suitable electrical coatings and/or other structure on the spindle means. FIG. 8 illustrates one spindle means generally designated 200 that may be useful in such an embodiment of applicant's invention wherein the spindle means is to be utilized as part of the final capacitor structure. As shown the spindle means 200 has a dielectric body core member 202 and a first capacitor end 204 and a second capacitor end 206. The first capacitor end 204 and second capacitor end 206 each have, respectively, an electrically conductive coating such as a copper coating 208 and 210 thereon. There is a spaced-apart relationship between the interior edges 212 and 214 of the coating 208 and 210 so that there is no electrical continuity therebetween.

When suitably attached to a rotating chuck or the like, the spindle 200 may be rotated about the axis 216 and the dielectric winding extends between the dotted lines 218 and 220 in the distance marked L bridging the central portion 222 of the core 202 that is not coated by either copper coating 208 or copper coating 210. During the winding about the axis 216 in the direction indicated by the arrow 224, capacitor plates may be inserted from either side and extend approximately to the line 226 on one side and 228 on the other. Since, on the first capacitor end 204 the capacitor plates would extend to the line 226 and there would be no dielectric in between from the line 218 to the line 226, as shown more clearly in FIG. 9 which is viewed along the line 9—9 of FIG. 8 after the capacitor has been built up to a desired number of capacitor plates, there may be suitably connected to the coating 208 for defining the appropriate set of capacitor plates. As shown on FIG. 9 the capacitor plates may be inserted upon both sides of the spindle 200 or, though not shown, on only one side. The capacitor plates may be deformed inwardly toward the electrically conductive coating 208 or solder or the like flowed between the plates for appropriate electrical continuity.

The apertures 230 and 232 may be utilized as desired for proper indexing when stacking the capacitor in a preselected environment.

While applicant's invention as above-described has so far been generally associated with flat wound capacitors wherein the capacitor plates are inserted from lateral directions with respect to the direction of winding, it will be appreciated that applicant's invention is not so limited. FIG. 10 is a perspective view of one embodiment of applicant's invention generally designated 250 in which a circular capacitor 252 is to be provided. An appropriate cylindrical spindle acting as a core 254 may be provided upon which the capacitor 252 is rotated in the direction indicated by the arrow 256 about the axis 258. The core member 254 may be a plane dielectric which stays within the capacitor after fabrication or may be a removable spindle similar to the flat one described above, or, alternatively, it may be a cylindrical rod having spaced-apart copper coatings adjacent the first capacitor plate end and the second capacitor plate end similar to that structure shown in FIG. 8 except, of course, in cylindrical cross-section rather than rectangular cross-section.

A dielectric winding 260 is provided and is wound from a dielectric roll 262 onto the capacitor 252 a preselected number of turns. Then, as desired, electrically conductive plate means such as electrically conductive plates 264 and 266 may be inserted on the capacitor from opposite directions as indicated by the arrows 268 and 270, respectively, in directions lateral to the winding of the dielectric winding 260 thereon. Each of the capacitor plates 264 and 266 are in a generally split tubular form and have sufficient resiliency so they may be slid over the capacitor 252 and be retained firmly in place without introducing air gaps therein as desired. The plate 266 is then rotated to show the split construction more clearly.

It will be appreciated that one of the capacitor plates could be segmented such as shown in FIG. 3 for a flat capacitor plate to provide a plurality of capacitors. That is, there would be a plurality of axial slits in the capacitor plate similar to the axial slit 264a with an end piece retaining them together until after assembly when the end piece may be suitably removed to prevent shorting therebetween and thus providing a plurality of plates. Suitable electrical termination of the plates may be made in the manner described above.

It will be appreciated that the plates 264 and 266 may be either preformed from metal sufficiently rigid to retain its shape or preselected lengths of foil could be utilized as desired.

In the embodiments of applicant's invention described above, it will be appreciated that many variations may be utilized in the techniques for achieving suitable electrical conneton between the various plates. For example, in addition to the methods described above, it may be desired, in some embodiments of applicant's invention, to bend inwardly each plate as it is inserted and weld it to the previous plate and/or to the electrically conductive coated spindle member if such be included, or, alternatively, each of the plates could be deformed simultaneously at the conclusion of the winding operation.

In those embodiments of applicant's invention wherein a cylindrical core and, consequently a cylindrical capacitor have been produced, it will be appreciated that such a unit could be flattened as desired after the fabrication as above-described has taken place and because of the particular type of capacitor plate described above the axial slit such as the slit 264a allows adequate give to prevent breaking of any capacitor plate.

This concludes the description of applicant's invention of an improved, flat, wound, high voltage capacitor. As can be seen from the above description and the accompanying drawings, applicant has been able to provide the economies associated with mass production by winding a capacitor wherein the dielectric is comprised of a plurality of thin layers from a thin sheet dielectric to improve the dielectric characteristics thereof and yet provide a generally rectangular prismatic capacitor configuration.

What is claimed is new and desired to be secured by Letters Patent of the United States is:

1. A flat-wound, high voltage capacitor comprising, in combination:

a spiral-wound, continuous, thin sheet dielectric having a first preselected width wound into a substantially flat, rectangular, prismatic configuration substantially symmetrical about a neutral plane and defining a plurality of insulating layers on a first side and a second side of said neutral plane, and each layer comprising:

a top portion lying in a plane substantially parallel to said neutral plane on said first side thereof;

a lower portion lying in a plane substantially parallel to said neutral plane and on a second side thereof;

a pair of spaced-apart, substantially parallel side edges having a preselected length, and said side edges defining the lateral boundaries of said top and said lower portions of each of said layers, and end portions connecting each top portion and lower portion of each layer sequentially with each other and with the next succeeding layer;

a first electrically conductive capacitor plate means having a predetermined length less than said preselected length of each of said pair of spaced-apart, substantially parallel side edges, and positioned intermediate first preselected adjacent layers of said spiral-wound dielectric;

a second electrically conductive capacitor plate means having a predetermined length less than said preselected length of said spaced-apart, substantially parallel side edges of said dielectric layers, and positioned intermediate second preselected adjacent layers of said spiral-wound dielectric, and said second preselected adjacent layers separated from said first preselected adjacent layers by a preselected plurality of said dielectric layers; and lead connecting means on each of said first capacitor plate means and said second capacitor plate means.

2. The arrangement defined in claim 1 wherein:
said lead connecting means on said first and said second capacitor plate means each comprise connecting portions on said first and said second capacitor plate means and each connecting portion of said first capacitor plate means extending beyond a first of said pair of spaced-apart, substantially parallel side edges of said dielectric and said connecting portion on said second capacitor plate means extending beyond the second of said pair of spaced-apart, substantially parallel side edges of said dielectric.

3. The arrangement defined in claim 1 wherein:
said lead connecting means on each of said first capacitor plate means and said second capacitor plate means each comprise lateral edge portions of said first capacitor plate means and said second capacitor plate means and said lateral edge portions substantially co-planer with a first and a second of said pair of substantially parallel side edges of said dielectric, respectively, and a soldered dip coat on each of said edges.

4. The arrangement defined in claim 2 wherein:
said first capacitor plate means comprises a first plurality of individual plate means in a spaced-apart relationship, and said second capacitor plate means comprises a second plurality of individual plate means in a spaced-apart relationship with each other and in alternating relationship with said first plurality of individual plate means.

5. The arrangement defined in claim 4 wherein:
a first group of each of said first and said second pluralities of individual plate means is on said first side of said neutral plane and a second group of each of said first and said second plurality of individual plate means is on said second side of said neutral plane.

6. The arrangement defined in claim 4 and further comprising:
a central, electrically conductive plate means positioned in said neutral plane, and said central plate means comprising one of said first plurality of individual plate means of said first capacitor plate means.

7. The arrangement defined in claim 4 wherein:
each of said first plurality of individual capacitor plate means comprises a spaced-apart group of electrically conductive segments insulated from each other and in aligned array with each other corresponding segment in the other of said plurality of individual capacitor plate means, and said second plurality of individual capacitor plate means of said second capacitor plate means electrically connected together and electrically insulated from said first plurality of individual capacitor plate means to define a common capacitor electrode.

8. The arrangement defined in claim 1 wherein:
said first capacitor plate means comprises a spaced-apart group of electrically conductive segments electrically insulated from each other.

9. A method of fabricating a flat, wound capacitor comprising the steps of:
spirally winding a thin sheet dielectric continuously about the spindle means;
inserting a first capacitor plate means between first preselected layers of the dielectric winding;
inserting a second capacitor plate means between second preselected layers of the dielectric winding;
coupling capacitor leads to each of said first and said second capacitor plate means;
removing said spindle means from said winding; and,
removing and connecting portions of said dielectric winding.

10. A method of fabricating a flat, wound capacitor comprising the steps of:
spirally winding a thin sheet dielectric continuously about the spindle means;
inserting a first capacitor plate means between first preselected layers of the dielectric winding;
inserting a second capacitor plate means between second preselected layers of the dielectric winding;
coupling capacitor leads to each of said first and said second capacitor plate means;
removing said spindle means from said winding; and,
removing preselected portions of said first capacitor plate to provide a plurality of electrically conductive segments therefrom.

11. A wound, high voltage capacitor comprising, in combination:
a spindle means;
a spiral wound, continuous, thin sheet dielectric having a first preselected width wound into a predetermined configuration about said spindle means and defining a plurality of insulating layers thereon, and each such dielectric layer further comprising:
a pair of spaced-apart substantially parallel side edges having a preselected separation therebetween to define the width of said dielectric layer, and said side edges further defining the lateral boundary of the dielectric portion of said spiral wound, continuous, thin sheet dielectric, and dielectric end portions connecting each layer with the next successive layer;
a first electrically conductive capacitor plate means having a predetermined length less than said preselected separation between said pair of spaced-apart substantially parallel side edges of said dielectric layer, and positioned intermediate preselected adjacent layers of said spiral wound dielectrics;
a second electrically conductive capacitor plate means having a predetermined length less than said preselected separation between said spaced-apart substantially parallel side edges of said dielectric layers, and positioned intermediate other preselected adjacent layers of said spiral wound dielectric, and said second preselected adjacent layers separated from said first preselected adjacent layers by a preselected plurality of said dielectric layers and electrically insulated therefrom;
and each of said first electrically conductive capacitor plate means of said second electrically conductive capacitor plate means having lead connecting portions extending laterally beyond said pair of spaced-apart substantially parallel side edges on a first side and a second side, respectively; and
lead connecting means on each of said first capacitor plate lead connecting portion and said second capacitor plate lead connecting portion.

12. The arrangement defined in claim 11, wherein: said spindle means is cylindrical.

13. The arrangement defined in claim 11 wherein: said spindle means is rectangular prismatic.

14. The arrangement defined in claim 13 wherein: said spindle means has an electrically conductive coating on each end thereof and said electrically conductive coatings are electrically insulated from each other.

References Cited

UNITED STATES PATENTS

| | | | |
|---|---|---|---|
| 2,437,212 | 3/1948 | Schottlant | 317—261 |
| 2,875,387 | 2/1959 | Randels | 317—260 X |
| 3,327,184 | 6/1967 | Valley | 317—260 X |
| 3,366,853 | 1/1968 | Rayburn | 317—260 |

ELLIOT A. GOLDBERG, Primary Examiner

U.S. Cl. X.R.

29—25.42; 317—261

UNITED STATES PATENT OFFICE
CERTIFICATE OF CORRECTION

Patent No. 3,539,886         Dated November 10, 1970

Inventor(s)    David Kellerman

It is certified that error appears in the above-identified patent and that said Letters Patent are hereby corrected as shown below:

Column 10, Lines 19-20, should read:

"removing end connecting portions of said dielectric winding."

Signed and sealed this 21st day of March 1972.

(SEAL)
Attest:

EDWARD M. FLETCHER, JR.          ROBERT GOTTSCHALK
Attesting Officer                Commissioner of Patents